United States Patent [19]

Willis

[11] Patent Number: 4,516,152

[45] Date of Patent: May 7, 1985

[54] VIDEO SIGNAL PROCESSOR WITH AUTOMATIC KINESCOPE WHITE BALANCE AND BEAM CURRENT LIMITER CONTROL SYSTEMS

[75] Inventor: Donald H. Willis, Indianapolis, Ind.

[73] Assignee: RCA Corporation, Princeton, N.J.

[21] Appl. No.: 497,157

[22] Filed: May 23, 1983

[51] Int. Cl.³ .................. H04N 9/535; H04N 9/18; H04N 5/68

[52] U.S. Cl. .................. 358/29; 358/74; 358/243

[58] Field of Search .............. 358/29, 243, 74, 65

[56] References Cited

U.S. PATENT DOCUMENTS 4,342,048 7/1982 Falater et al. .................. 358/242
4,370,674 1/1983 Johnson et al. .................. 358/74

FOREIGN PATENT DOCUMENTS 1514220 6/1978 United Kingdom .

OTHER PUBLICATIONS

ITT Corp. Technical Bulletin, "Digit 2000 VLSI Digital TV System" Apr. 1983.

Primary Examiner—John C. Martin
Assistant Examiner—Howard L. Carter
Attorney, Agent, or Firm—Eugene M. Whitacre; Paul J. Rassmussen; Ronald H. Kurdyla

[57] ABSTRACT

A color television receiver includes a network for automatically limiting excessive kinescope beam currents developed in response to video signal image information, and a white balance control network for automatically controlling the white level drive (gain) characteristics of the kinescope in response to a white drive reference signal applied to the video signal path during given measuring intervals. A control signal developed by the beam current limiter network, otherwise applied to the video signal path, is decoupled from the video signal path during the white level measuring intervals to prevent distortion of the white level control function.

6 Claims, 5 Drawing Figures

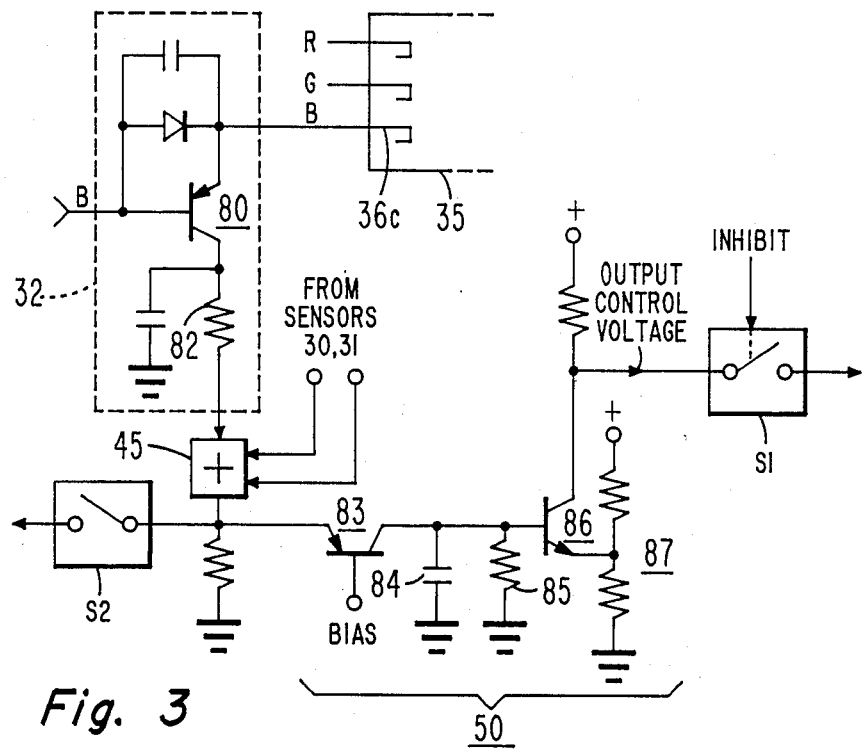
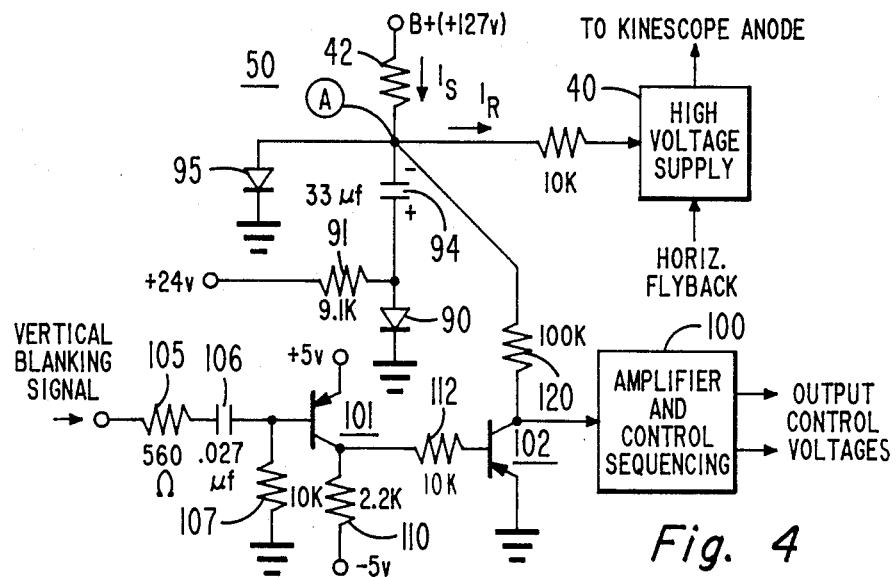
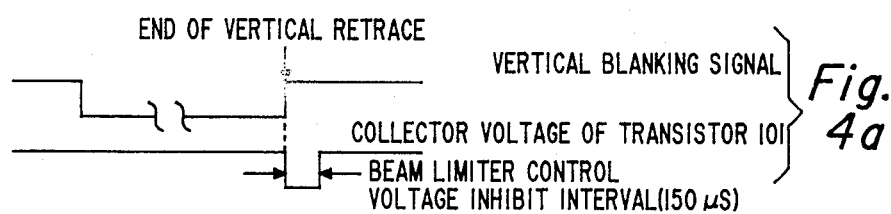

VIDEO SIGNAL PROCESSOR WITH AUTOMATIC KINESCOPE WHITE BALANCE AND BEAM CURRENT LIMITER CONTROL SYSTEMS

This invention concerns a video signal processing and display system, such as a television receiver, which includes networks for automatically providing white current balance and limiting of excessive beam currents of an associated image reproducing kinescope.

The emission characteristics of the electron guns of a color kinescope in a television receiver are subject to varying as a function of temperature and aging, among other factors. When such variations affect the gain related transconductance of one or more electron guns, the affected electron guns conduct improper white level currents in response to a white level video drive signal. Thus a non-white color image is produced in response to a white video signal, and the overall color fidelity of a reproduced image is impaired.

Some color television receivers include systems for automatically compensating for variations of the electron gun emission characteristics which relate to the gains of the electron guns. Such automatic control systems are desirable because they continuously maintain the proper gain characteristic of the electron guns, and because they eliminate the need for time consuming manual kinescope gain adjustments during the receiver manufacturing process and afterwards as the kinescope ages. Such automatic kinescope level control systems, also known as "white balance" systems, often operate by applying a white reference signal to preceding video signal processing circuits during intervals when video information signals are absent. The resulting kinescope electron gun current is then sensed and compared with a reference signal representative of a corresponding correct kinescope white current level. As a result of this comparison, a control signal indicating the amount by which the electron gun white current level differs from the correct level is generated and used to adjust the signal gain of an associated amplifier in the video signal path until the correct electron gun white current level is produced.

Many television receivers also include a system for automatically limiting excessive kinescope beam currents conducted in response to video signal image information. A system of this type is described in my U.S. Pat. No. 4,167,025. Excessive beam currents of this type can degrade a reproduced image by disrupting the operation of the deflection circuits of the receiver and causing electron beam spot defocussing and picture blooming. Excessive beam currents can also exceed the safe operating current capability of the kinescope, possibly damaging the kinescope and associated circuit components.

It is herein recognized that the operation of the automatic kinescope white balance system can be undesirably disturbed by the output signal from the automatic beam current limiter. To prevent this from occurring, in accordance with the principles of the present invention there is disclosed herein an arrangement wherein the beam limiter output signal is prevented from affecting the video signal processing circuits during intervals when the gun current sensing portion of the kinescope white balance control system is operating.

In the drawing:

FIG. 3 depicts circuit details of a portion of the arrangement of FIG. 1;

FIG. 4 shows circuit details of a beam limiter control circuit and switch circuit suitable for use in the arrangement in FIG. 1; and FIG. 4a shows signal waveforms associated with the operation of the circuits of FIG. 4.

Figure 1:
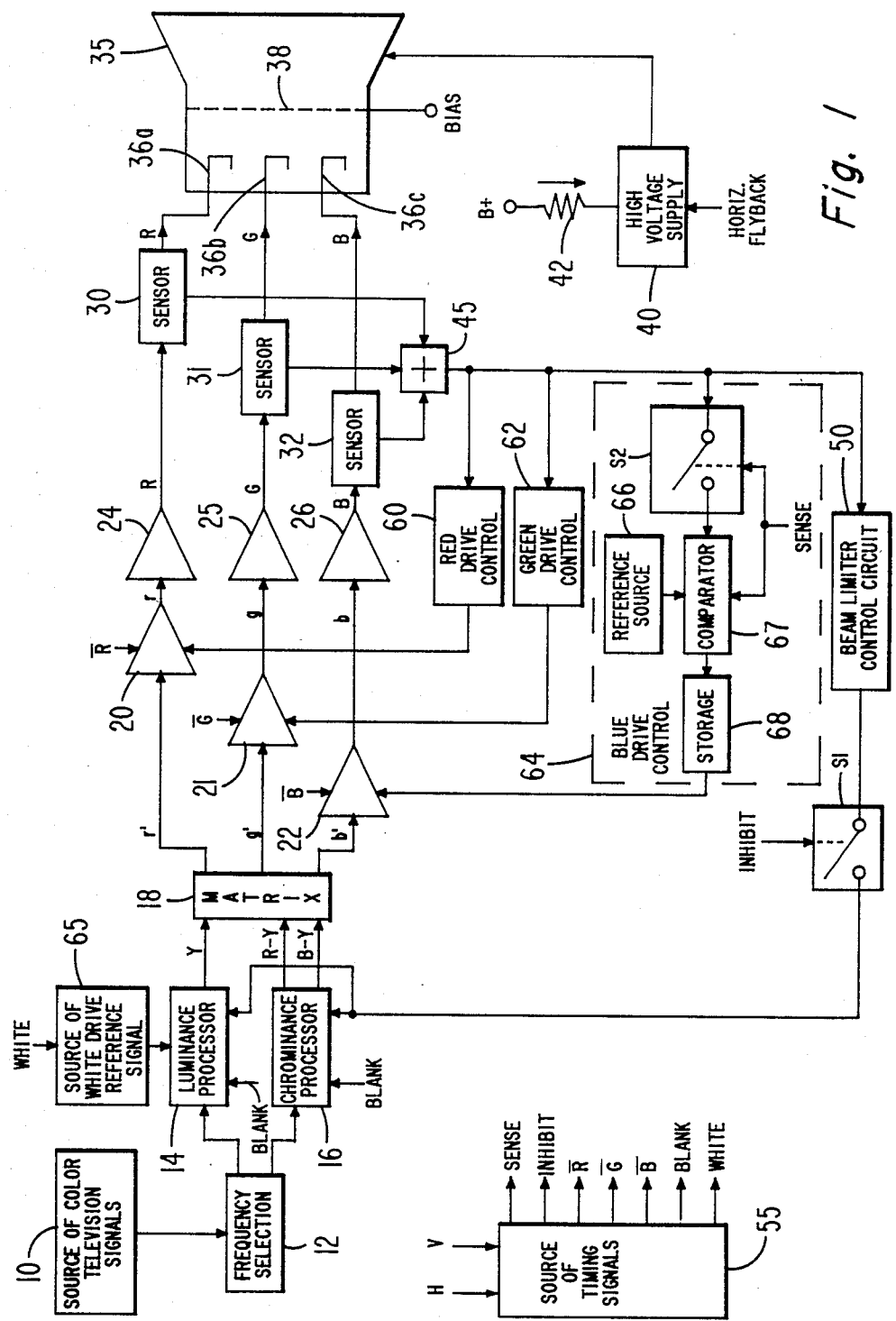
FIG. 1 shows a portion of a color television receiver including an automatic kinescope white balance control system and an automatic kinescope beam limiter system together with apparatus according to the present invention.

In FIG. 1, color television signals from a source 10 are supplied to a frequency selection network 12 (e.g., including a comb filter) for providing a separated luminance component of the television signal to a luminance processor 14, and a separated chrominance component to a chrominance processor 16. Chrominance processor 16 provides output R−Y and B−Y color difference signals which are combined in a matrix 18 with an output luminance signal Y from processor 14. Matrix 18 supplies low level r', g' and b' color image representative signals to respective gain controllable amplifiers 20, 21 and 22, which in turn respectively provide amplified r, g and b color signals to video output kinescope driver amplifiers 24, 25 and 26. The kinescope driver amplifiers produce high level R, G and B color signals suitable for driving intensity control cathode electrodes 36a, 36b and 36c of a color kinescope 35. The respective output signals from the kinescope driver amplifiers are coupled to kinescope cathodes 36a, 36b and 36c via networks 30, 31 and 32, which also serve as current sensors as will be discussed subsequently.

Kinescope 35 is of the self-converging, "in-line" gun type with a single control grid electrode 38 commonly biased with respect to each of cathodes 36a, 36b and 36c, which comprise separate red, green and blue kinescope electron guns with grid 38. A high operating voltage for the anode electrode of kinescope 35 is provided from a high voltage supply 40 (e.g., comprising a voltage multiplier) responsive to horizontal flyback pulses derived from the deflection circuits of the receiver. Kinescope beam resupply currents are supplied to high voltage network 40 via a resistor 42 associated with a DC operating potential (B+).

The receiver also includes an automatic kinescope beam current limiter control circuit 50 for limiting video signal drive to the kinescope to thereby limit excessive kinescope beam currents when the kinescope is sensed as conducting excessive beam currents (cathode currents) above a given threshold level. During image scanning (trace) intervals of the video signal, the magnitudes of the video image representative kinescope cathode currents are respectively sensed by networks 30, 31 and 32, and the sensed currents are combined in a network 45 to produce a total sensed current related to the total kinescope cathode curren,t. The magnitude of this current is sensed by beam limiter control circuit 50, which develops and stores (e.g., by means of a capacitor) an output control signal related to the amount by which the sensed kinescope current exceeds the given threshold level. This control signal is coupled via a normally closed (i.e., conductive) electronic switch S1 to chrominance processor 16 and luminance processor 14 with a polarity for limiting the magnitudes of the chrominance and luminance signals, to thereby limit the kinescope beam current to a prescribed safe level.

Beam current limiting can be accomplished, as is known, by reducing the DC level of the luminance signal (i.e., reducing the brightness of a reproduced image), and by reducing the peak-to-peak amplitudes of the luminance and chrominance signals (i.e., reducing image contrast). With respect to the latter amplitude control function it is noted that many color television receivers include a circuit, e.g., comprising a viewer adjustable potentiometer, for concurrently controlling the amplitudes of both the luminance and chrominance signals. The beam limiter control signal can be applied to such circuit for the purpose of concurrently controlling the amplitudes of the luminance and chrominance signals.

The operation of switch S1 is associated with the operation of an automatic kinescope white balance control system. The white balance system automatically compensates for variations of the kinescope electron gun emission characteristics which relate to the gains of the electron guns, in order to maintain proper drive ratios for the electron guns. Since the gain characteristics of the electron guns are subject to changing with temperature and aging for example, the ability of the kinescope to properly produce a white display in response to a white video drive signal is impaired unless compensation is provided such as by means of the white balance system.

The white balance system comprises plural drive control networks 60, 62 and 64 respectively associated with the red, green and blue kinescope cathode signal coupling paths, and a source of white drive reference signal 65 coupled to luminance processor 14. Except as otherwise noted, the functional elements of drive control networks 60, 62 and 64 are similar. Accordingly, only the functional elements of drive control network 64 for the blue kinescope electron gun are shown and will be discussed.

Figure 2:
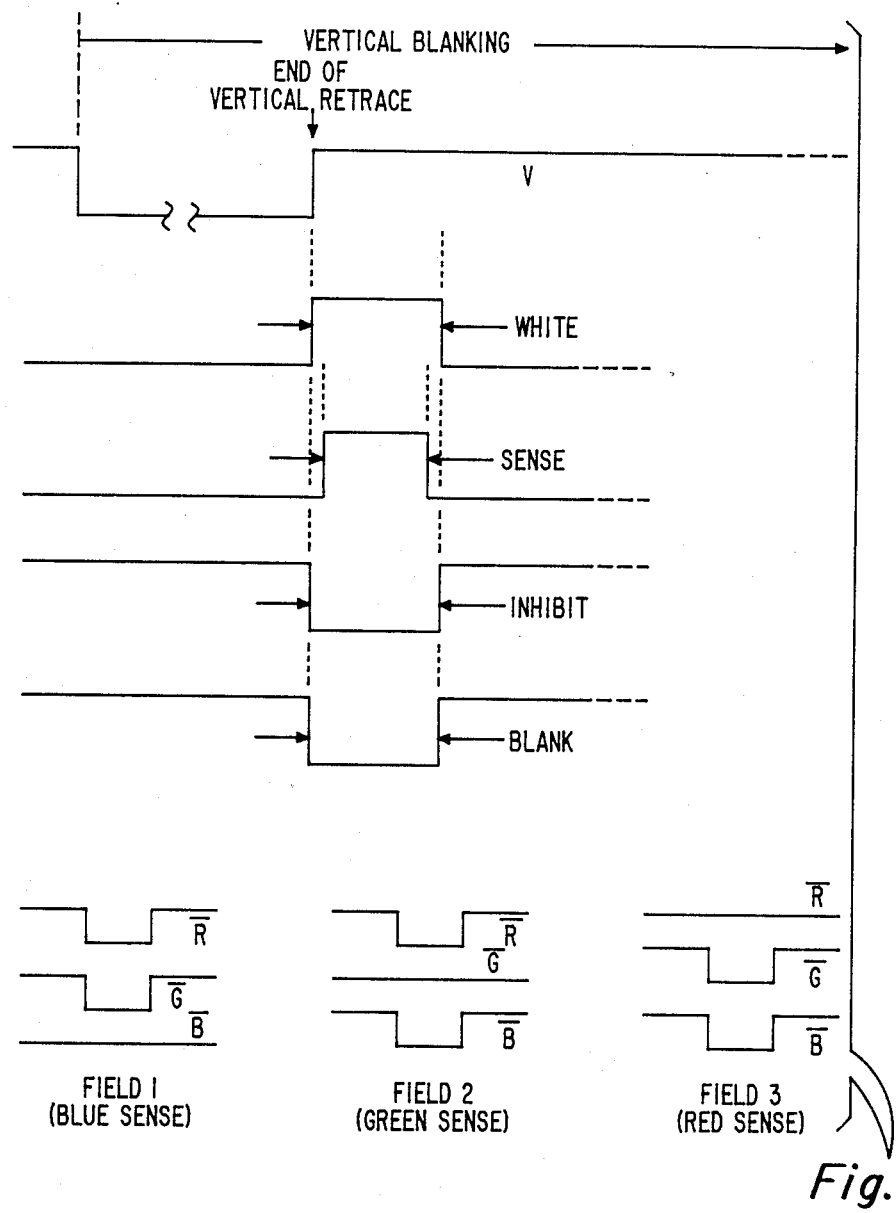
FIG. 2 shows timing signal waveforms helpful in understanding the operation of the arrangement of FIG. 1.

The following discussion of the operation of the white balance system is made with reference to the white balance timing signal waveforms shown in FIG. 2. These timing signals are provided by a timing signal generator 55, which responds to vertical (V) and horizontal (H) image synchronizing signals derived from deflection circuits of the receiver, and which may include combinational logic circuits such as logic gates and sequential logic circuits such as binary counters.

At the end of each vertical field retrace interval during each vertical blanking interval, at which time video image information is absent, a reference signal (e.g., a DC voltage) representative of a significant white drive level luminance signal is coupled to luminance processor 14 from reference source 65. This coupling is enabled by a WHITE timing signal which encompasses a few horizontal line intervals and begins at the end of the vertical retrace interval. The magnitude of the white reference signal applied to luminance processor 14 can be about 10% of a full white luminance signal, although some receiver systems may require a larger white reference signal approaching the magnitude of a normally expected 100% peak white luminance signal. At this time a BLANK signal is applied to chrominance processor 16, and to circuits in luminance processor 14 which precede the circuits to which the white reference signal is applied. The BLANK signal renders the preceding circuits in luminance processor 14 non-conductive to assure that spurious signals and video signal synchronizing components do not disturb the operation of the white balance system. Also at this time, $\overline{R}$ and $\overline{G}$ signals are applied to red and green signal amplifiers with an amplitude and sense for rendering these amplifiers non-conductive when the white balance system operates with respect to the blue kinescope electron gun signal path. That is, of the red, green and blue gain controllable amplifiers 20, 21 and 22, only blue amplifier 22 remains conductive when the white balance system operates with respect to the blue signal path and the associated blue kinescope electron gun.

As seen from FIG. 2, during a first vertical field blanking interval when the blue kinescope electron gun white current is sensed, negative-going signals $\overline{R}$ and $\overline{G}$ render amplifiers 20 and 21 non-conductive while the condition of signal $\overline{B}$ permits blue amplifier 22 to remain conductive during the white balance test interval. The relative conditions of the $\overline{R}$, $\overline{G}$ and $\overline{B}$ signals during succeeding second and third field blanking intervals, when the green and red electron gun currents are respectively sensed, are also shown in FIG. 2.

The white reference signal is conducted via amplifier 22 and associated kinescope driver amplifier 26 to produce a white reference drive signal for the blue kinescope electron gun comprising cathode 36c. The corresponding white reference level current conducted by blue cathode 36c is sensed by sensor 32 and coupled via network 45 to the input of blue drive control network 64.

Blue drive control network 64 comprises an input electronic switch S2, a source of reference current 66, a differential current comparator 67, and an output storage network 68. Both input switch S2 and comparator 67 are controlled in response to a SENSE signal which occurs during the interval encompassed by the WHITE timing signal. The magnitude of the reference current from source 66 is preselected such that it corresponds to the magnitude of the blue cathode current, as supplied to comparator 67, when the latter current as conducted in response to the white reference signal is correct. Thus the magnitude of the white reference signal from source 65 and the magnitude of the reference current from source 66 are related and selected one with respect to the other. The sensed signal supplied to network 64 could also be in the form of a voltage rather than a current, in which case source 66 would supply an appropriate reference voltage and comparator 67 would comprise a voltage comparator.

During the white current sensing interval for the blue electron gun, switch S2 is rendered conductive and comparator 67 is rendered operative in response to the SENSE signal. The comparator produces an output error correction signal if the blue gun current is too high or too low. The correction signal is stored by storage network 68 (e.g., comprising a capacitor) and is applied to a gain control input of amplifier 22 for changing the gain of amplifier 22 with a sense for producing a correct blue gun current. Storage network 68 maintains the error correction signal at the gain control input of amplifier 22 until the next blue gun current sensing interval, which occurs three vertical fields later. The gain correction output signal from comparator 67 remains unchanged if the currents sensed by comparator 67 are substantially equal, indicating that the current conduction level (gain) of the blue electron gun is correct.

Red and green drive control networks 60 and 62 operate in a similar fashion during subsequent field blanking intervals with respect to the red and green electron gun white balance measurements. The levels of the reference currents supplied by the reference current sources in red and green drive control networks 60 and 62 are selected in accordance with normally "correct" gain-related emission characteristics of the red and green electron guns. Also, the input switch and comparator associated with red and green drive control networks 60,62 are rendered non-conductive during the white balance measuring interval for the blue electron gun. For such purpose the SENSE signal applied to the input switch and comparator of networks 60,62 exhibits a magnitude and polarity sufficient to maintain the input switch and comparator of networks 60,62 non-conductive during the blue electron gun white balance measuring interval. That is, only that drive control network associated with the electron gun under test is rendered operative during a given field interval.

It is noted that switch S1 is rendered non-conductive (i.e., open, as shown) for the duration of each WHITE timing signal. Thus the beam limiter control signal from network 50 is decoupled from the video signal path during the white balance testing intervals. Otherwise, the beam limiter control signal would undesirably influence the conduction of the video signal path, thereby resulting in a distortion of the sensed white drive current conducted by the kinescope.

Illustratively, assume that the beam limiter control signal, as developed in response to video information from a preceding image field, reduced the gain of circuits in luminance processor 14. This gain reduction would also result in a reduced level of the white reference signal output from luminance processor 14 and, assuming the kinescope electron gun gain characteristic was otherwise correct, would be incorrectly interpreted by the white balance control circuits as a condition requiring the gain of the video path to be increased to compensate for a "low" electron gun gain condition. Thus the drive signal gain would be improperly increased to counteract the effect of the beam limiter control voltage.

By preventing the video signal path from responding to the beam limiter control voltage during the white balance measuring intervals, the white balance measurements are properly made without influence from the beam limiter network, and the beam limiter network operates normally at other times.

FIG. 3 shows additional details of current sensor 32, as well as details of one type of circuit suitable for use as beam limiter control circuit 50.

In FIG. 3, blue drive signals are coupled to blue cathode 36c of kinescope 35 by means of a PNP emitter follower transistor 80. The collector current of transistor 80 is related to the drive current conducted by the blue kinescope electron gun, and flows through a collector resistor 82. This current is sensed by current comparator 67 when switch S2 closes during the blue green white balance interval.

For beam limiting control purposes, the blue electron gun image information current conducted by transistor 80 together with the red and green gun video information currents conducted by similar transistors in sensors 31 and 32, after summation in combiner 45 are sensed by a PNP transistor 83 with a collector output electrode coupled to an RC time constant network comprising a storage capacitor 84 and a resistor 85. The voltage developed across and stored by capacitor 84 is related to the magnitude of the total kinescope image information beam current and is applied to the base of a normally non-conductive transistor 86. The threshold conduction level of transistor 86 is determined by an emitter bias circuit 87. If the base voltage of transistor 86 is sufficient to render transistor 86 conductive, indicating the presence of excessive kinescope beam current conduction, an output beam limiter control voltage is provided from the collector circuit of transistor 86 via conductive switch S1 to the video signal path with a sense for modifying the conduction of the signal path in a direction to limit the excessive beam current.

FIG. 4 shows another version of beam limiter sensing and control circuit 50, as well as details of an associated switching circuit suitable for use with such sensing and control circuit. High voltage supply 40 receives a resupply current component ($I_R$) of a source current ($I_S$) conducted by resistor 42. The resupply current is representative of the kinescope beam current demand. A diode 90 is normally conductive in response to bias provided by means of a DC, bias voltage source (+24 volts) and a resistor 91. Thus an average responding filter and storage capacitor 94 is conductively coupled between a sensing node A and ground via diode 90 when conducting. The voltage at node A is related to beam current demand. Node A is clamped to a fixed voltage by means of a diode 95 until a threshold condition of excessive beam current is reached as a result of an increased level of resupply current $I_R$. At such time the voltage at node A decreases sufficiently to render diode 95 non-conductive, and the voltage change across capacitor 94 is representative of the magnitude of excessive average beam currents. In the presence of excessive transient peak beam current demand, diode 90 is rendered non-conductive whereby capacitor 94 is decoupled from ground. The voltage at node A then decreases rapidly and tracks with the excessive transisent peak resupply current demand. The circuit comprising diode 90, resistor 91, capacitor 94 and diode 95 thus advantageously provides a voltage at sensing node A as a function of both average and peak excessive beam current conditions, as described in detail in my U.S. Pat. No. 4,167,025.

A switching circuit comprising transistors 101 and 102 prevents the beam limiter control voltage as developed at node A from being applied to a beam limiter amplifier and control sequencing network 100. The base of normally conductive transistor 101 receives the vertical signal via resistor 105 and capacitor 106. The positive-going edge of the vertical signal which occurs at the end of vertical retrace (see FIG. 4a) renders transistor 101 non-conductive. Transistor 101 remains non-conductive until approximately 150 microseconds later, when capacitor 106 is sufficiently discharged via resistor 107. While transistor 101 is non-conductive, the bias provided by resistors 110 and 112 enables transistor 102 to conduct during the 150 microsecond interval, which corresponds to the beam limiter control voltage inhibit interval. Thus the switching action of transistor 101 provides an INHIBIT signal for controlling the conduction of transistor 102.

The collector of transistor 102 is coupled to beam limiter sense point A via a resistor 120. The collector voltage of transistor 102 approximates the emitter voltage of transistor 102 (i.e., ground potential) while transistor 102 is conducting. The conductive state of transistor 102 during the inhibit interval prevents the beam limiter control voltage from node A from being applied to network 100 due to the shunt conducting action of transistor 102 during the inhibit interval. At the end of the inhibit interval, transistor 101 resumes conduction, rendering transistor 102 non-conductive and permitting normal beam limiting control action to occur.

The collector of transistor 102 is coupled via appropriate interfacing circuits to a beam limiter amplifier and control sequencing network 100, which can include circuits for providing sequential beam limiter control such as described in U.S. Pat. No. 4,253,110 of L. A. Harwood, et al. As described in the Harwood, et al. patent, sequencing circuit 100 provides first and second beam limiting output control voltages in response to the control voltage developed at node A. The first control voltage is produced when excessive beam current exceeds a threshold level over a first range, and serves to reduce the signal gain of the video signal path to limit excessive beam currents over the first range. When beam current exceeds the threshold level over a second range, above the first range, the second control voltage is produced to provide additional beam current limiting by reducing the DC level of signals conducted by the video path. By this mechanism beam current limiting is accomplished by sequentially controlling both image contrast (via signal gain control) and image brightness (via signal DC level control).

Apparatus according to the present invention can be used with video signal processing systems employing analog signal processing circuits, as well as digital signal processing circuits such as those included in the digital television signal processing system recently introduced by the Worldwide Semiconductor Group (Freiburg, West Germany) of International Telephone and Telegraph Corporation. The latter system includes integrated circuits comprising the MAA2000 Central Control Unit, the MAA2100 Video Codec Unit and the MAA2200 Video Processor Unit, for providing a digital version of a composite color television signal, luminance-chrominance frequency selection, and various luminance and chrominance processing and control functions, as disclosed in an ITT publication titled "VLSI Digital TV System - DIGIT 2000." This digital television signal processing system also includes provision for limiting excessive image representative kinescope beam currents, and for automatically providing white balance control with respect to the individual kinescope electron guns.

What is claimed is:

1. In a system including a video channel for processing a video signal containing image information, and an image display device responsive to signals coupled thereto via said video channel, apparatus comprising:
    means for automatically limiting excessive beam currents conducted by said image display device in response to said video signal image information, said limiting means providing a beam current limiting control signal to said video channel for controlling the conductive condition of said video channel;
    means coupled to said video channel and to said image display device for monitoring the current conduction of said image display device during prescribed monitoring intervals; and
    means for inhibiting said beam limiter control signal during said prescribed monitoring intervals.

2. Apparatus according to claim 1, wherein
    said monitoring means monitors white level currents conducted by said image display device during said monitoring intervals.

3. Apparatus according to claim 2, wherein
    a reference signal is applied to said video channel during said monitoring intervals, said reference signal being of a significant magnitude and white-going image sense for increasing the current conduction of said image display device during said monitoring intervals; and
    said monitoring means sense the magnitude of currents conducted by said display device in response to said reference signal.

4. Apparatus according to claim 3, wherein
    said image display device comprises a kinescope having an electron gun including a cathode intensity control electrode;
    said reference signal is applied to said cathode electrode via said video channel; and
    said monitoring means senses the magnitude of said cathode current.

5. Apparatus according to claim 3, wherein
    said reference signal is applied to said video channel during video image blanking intervals.

6. Apparatus according to claim 1, wherein
    said control signal inhibiting means comprises electronic switch means connected between said beam current limiting means and said video channel; and
    said switch means is caused to exhibit a conductive state during said monitoring intervals for decoupling said control voltage from said video channel.

* * * * *

UNITED STATES PATENT AND TRADEMARK OFFICE
CERTIFICATE OF CORRECTION

PATENT NO. : 4,516,152
DATED : May 7, 1985
INVENTOR(S) : Donald Henry Willis

It is certified that error appears in the above-identified patent and that said Letters Patent is hereby corrected as shown below:

```
Column 2, line 58 "curren,t" should be --current--
Column 5, line 56 delete "green"
Column 5, line 61 "31 and 32" should be --30 and 31--
Column 6, line 34 "transisent" should be --transient--
Column 8, line 45, Claim 6 "conductive" should be
         --non-conductive--
```

Signed and Sealed this

Twenty-seventh Day of August 1985

[SEAL]

Attest:

DONALD J. QUIGG

Attesting Officer

Acting Commissioner of Patents and Trademarks